United States Patent [19]

Garron

[11] 4,132,911

[45] Jan. 2, 1979

[54] ELECTRIC MOTOR WITH PERMANENT MAGNETS COMBINED WITH ELECTROMAGNETS

[75] Inventor: Carlos S. Garron, Kensington, Md.

[73] Assignee: C. S. G. Enterprises, Inc., Rego Park, N.Y.

[21] Appl. No.: 807,318

[22] Filed: Jun. 16, 1977

Related U.S. Application Data

[63] Continuation of Ser. No. 669,718, Mar. 24, 1976, abandoned, which is a continuation of Ser. No. 402,284, Oct. 1, 1973, abandoned.

[51] Int. Cl.² .............................................. H02K 37/00
[52] U.S. Cl. ...................................... 310/46; 335/229
[58] Field of Search .................. 310/46, 181; 335/229, 335/230

[56] References Cited
U.S. PATENT DOCUMENTS

| | | | |
|---|---|---|---|
| 1,859,643 | 5/1932 | Worthington | 310/46 |
| 1,863,294 | 6/1932 | Bogia | 310/46 |
| 3,089,064 | 5/1963 | deBennetot | 335/229 |

Primary Examiner—Donovan F. Duggan
Attorney, Agent, or Firm—Fitzpatrick, Cella, Harper & Scinto

[57] ABSTRACT

An electric motor which includes in the stator or the armature or both one or more assemblies of an electromagnet and permanent magnet contained in the same a magnetic flux circuit. The electromagnet is periodically energized from a battery or other appropriate electric current source by switch means comprising a commutator or the like on the armature whereby the enclosed magnetic flux circuit is nullified or otherwise disrupted and the permanent magnet is caused to react and create relative movement with further magnetic means in the stator or armature, the armature being thereby rotated. The windings for the electromagnets may be located near the center of the armature, or in the stator, the windings may be substantially spaced from the armature if desired.

3 Claims, 5 Drawing Figures

ELECTRIC MOTOR WITH PERMANENT MAGNETS COMBINED WITH ELECTROMAGNETS

This is a continuation of application Ser. No. 669,718, filed Mar. 24, 1976, now abandoned which in turn is a continuation of application Ser. No. 402,284, filed Oct. 1, 1973 now abandoned.

SUMMARY OF THE INVENTION

The invention involves an electric motor which includes permanent magnets in either the stator or the armature or both and wherein the magnetic reaction which causes the armature to rotate is created by the alternating nullification and reestablishment of the closed magnetic flux circuit — the application of magnetic attraction or repulsion taking place between a permanent magnet and further magnetic structure (which may include another permanent magnet) during periods when the closed flux circuit is disrupted.

The invention provides an effective and efficient constant power-type motor of a type which may be useful, in particular, for electric cranes, hoists, winches, electric vehicles and starter motors for internal combustion engines. The motor is highly unlikely to burn out or overheat and this feature is abetted due to the circumstance that only sufficient current is needed for operation of the motor to annul the magnetic flux circuits involved and because the windings provided for this purpose may be conveniently accommodated within the motor for effective cooling.

Other adaptabilities and capabilities of the invention will be understood as the description progresses, reference being had to the accompanying drawings, in which:

DESCRIPTION OF THE PREFERRED EMBODIMENT

Figure 1:
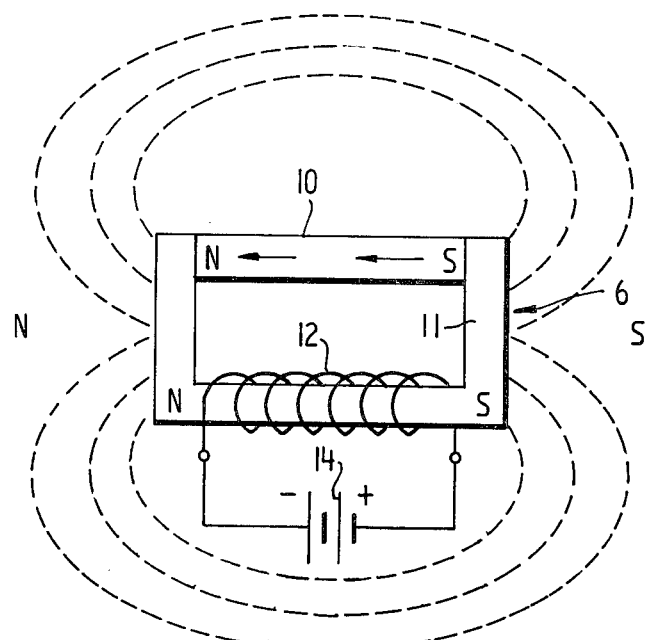
FIG. 1 is a diagrammatic representation of an armature in accordance with the invention.

Referring now to FIG. 1, it will be seen that the armature 6 includes a permanent magnet 10 and a U-shaped core 11 provided with a winding or coil 12 which is connected to an electric energy source comprising a battery 14. By allowing electric current from battery 14 to energize coil 12, due to the appropriate winding of coil 12, North and South poles appear in the same relative direction as exists in magnet 10 at both extremes (arms) of core 11. It is to be observed that this is the equivalent of the arrangement in FIG. 2 wherein a permanent magnet 15, which has been substituted for coil 12, is connected by iron bars 16 and 17 South pole to South pole and North pole to North pole to magnet 10. Accordingly it will be understood that only sufficient electrical power is required from battery 14 to render coil 11 identical, from a magnetic flux standpoint, to permanent magnet 15.

In accordance with laws of magnetism, the magnetic density at the extremes of core 11 is doubled in FIG. 1 by the inclusion of the coil 12 together with electrical energy from battery 14 whereas the force of attraction, which is proportional to the square of the magnetic density, is increased four-fold.

Figure 2:
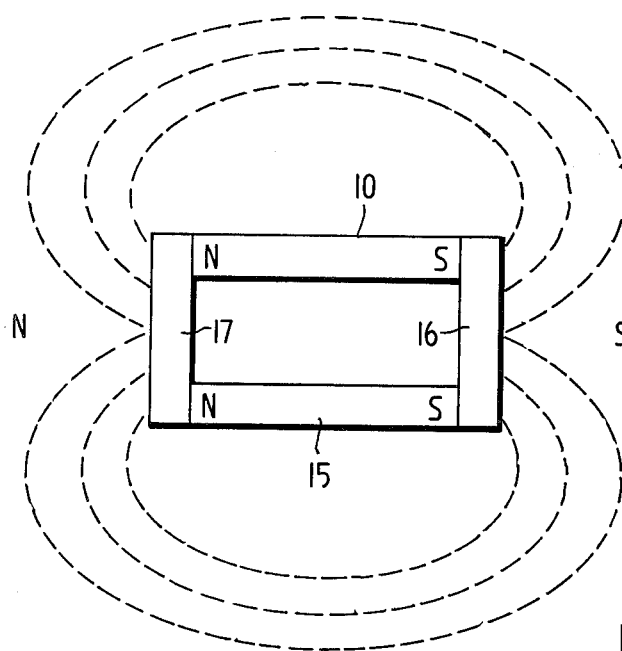
FIG. 2 is an illustration of the magnetic equivalent of the arrangement shown in FIG. 1.

If battery 14 is disconnected, then the armature shown in FIG. 1 becomes essentially a toroid and the lines of magnetic force are within the toroid and do not react externally. In FIG. 2, if magnet 15 be considered a simple iron bar, the equivalent structure is achieved. Thus it will be appreciated that the system provides for the complete cancellation of forces of attraction and repulsion of the magnet 10 at one stage and, in the active stage, through utilization of the electric force equal to the power to create an electromagnet in the system equivalent to the magnet 15, the system is activated with a force of attraction which is increased four-fold.

Figure 3:
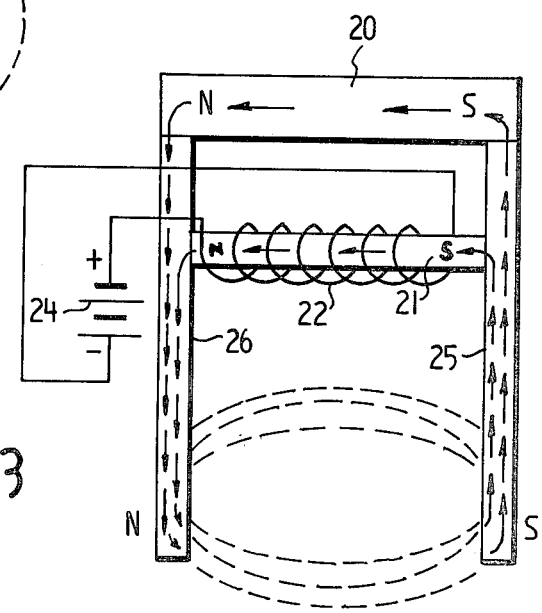
FIG. 3 is a diagrammatic representation of a stator in accordance with the invention.
Figure 4:
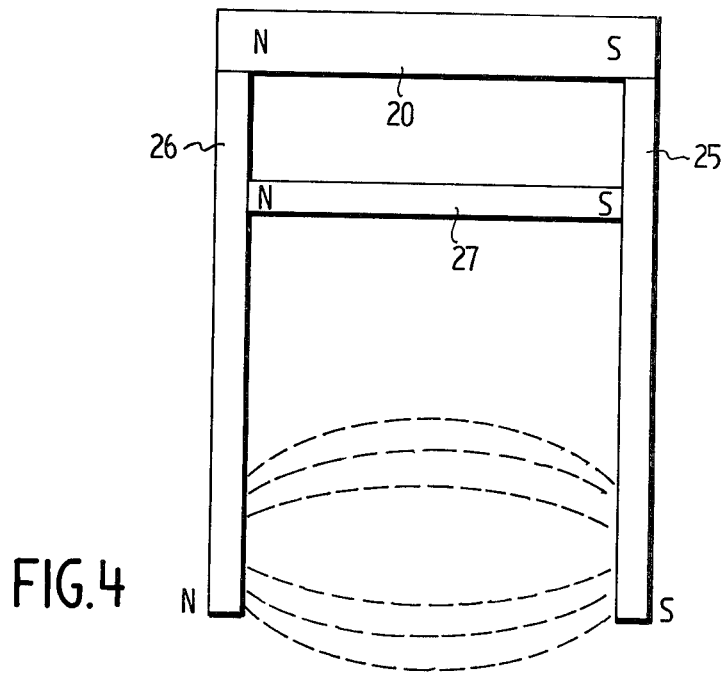
FIG. 4 is an illustration of the magnetic equivalent of the stator shown in FIG. 3.

Referring now to FIGS. 3 and 4, the stator illustrated in these Figures comprise a permanent magnet 20 and an iron core 21 provided with a winding 22 connected to an energy source comprising a battery 24. Permanent magnet 20 and core 21 are connected by a pair of iron bars or legs 25 and 26. With this system, substantially the same effect previously described occurs in that when an electric current passes through coil 22, North and South poles appear in iron legs 25 and 26, including the lower aspects of such legs.

In FIG. 4, it is shown that this is equivalent to substituting a permanent magnet 27 for the core 21 and coil 22 of FIG. 3.

Thus, in FIG. 3 battery 24 is disconnected, then a closed flux circuit is created between the core 21, the upper aspect of leg 26, the permanent magnet 20, and the upper aspect of leg 25 so that the North and South poles in the lower aspects of legs 26 and 25 no longer exist.

Figure 5:
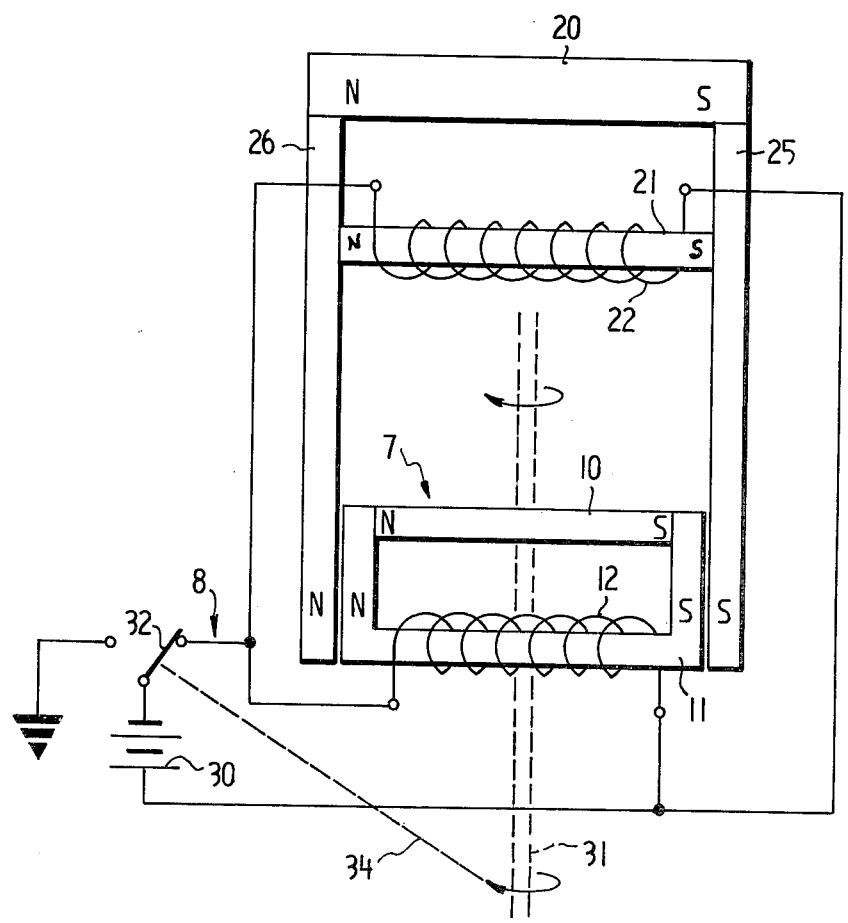
FIG. 5 illustrates the assembly of the stator and armature illustrated in the prior Figures.

FIG. 5 discloses the system assembled with the addition of a shaft constituting an axle member 31, shown diagrammatically, which supports the rotor 7, a battery 30, or other appropriate source of electrical energy, connects both to coils 12 and 22 through a circuit 8. A switch 32 is provided in circuit 8, indicated by dotted line 34 as being mounted on or otherwise connected to axle member 31 whereby the coils 12 and 22 are periodically activated by the rotation of axle member 31.

With a system assembled as shown in FIG. 5 and with the switch 32 closed whereby the coils 12 and 22 are receiving an electrical current, poles appear in both parts of the system, the stator as well as the armature. These poles, as seen in the drawings, face each other North to North and South to South and a repulsion takes place whereby the armature rotates 90° on the axle member 31. Upon such rotation, an attraction then exists between the South pole of the armature and the North pole of the stator on one side and the North pole of the armature and South pole of the stator on the other whereby the poles are attracted. As they arrive to about a face-to-face position, the switch 32 opens and, inasmuch as the magnetic poles are then substantially eliminated as previously explained, the attraction or repulsion is effectively cancelled and the armature completes the remaining 180° rotation by inertia to return to the position illustrated in FIG. 5 and to repeat the cycle. In practice, the switch 32 is a half ring mounted on axle member 31 which is contacted by means of a brush so that switch 32 is actually a commutator to interrupt and provide current substantially to coils 12 and 22 at the proper time as is well known in the art.

It will be appreciated that the polar parts of the armature as well as the stator are shaped as required by the state of the art to concentrate the magnetic fields and reduce inefficiency. The assembly may be arranged with two rotors and stators on the same shaft or axle member whereby when one is on the half-turn due to repulsion of attraction forces, the other is on the half-turn involving inertia. Such arrangements do not alter the working principles which are described above.

Having thus described my invention, what I claim as new and desire to secure by Letters Patent of the United States is:

1. An electric motor comprising:

an assembly including a permanent magnet, an electromagnet, and first magnetic circuit means for providing a closed flux circuit for said permanent magnet, through said electromagnet, when said electromagnet is deenergized, and for providing an external flux path for the additive flux of both said permanent magnet and said electromagnet when said electromagnet is energized, wherein the magnetic density in said external path is substantially doubled as compared to the density which would result from a single one of said magnets;

means for energizing and deenergizing said electromagnet; and second magnetic circuit means disposed in said external flux path for causing a magnetic reaction to provide relative movement between said assembly and said second magnetic circuit means when said electromagnet is energized, wherein said magnetic reaction is substantially eliminated when said electromagnet is deenergized, and wherein said force of magnetic reaction is more than doubled as compared to the reaction which would result from a single one of said magnets.

2. An electric motor, as set forth in claim 1, wherein said assembly comprises a stator of said motor, said second magnetic circuit means comprises a rotor of said motor, and said electromagnet and said permanent magnet are included in said stator.

3. An electric motor as set forth in claim 2, wherein said motor comprises a second permanent magnet, a second electromagnet, and means providing a closed magnetic flux path for said second permanent magnet, through said second electromagnet, when said second electromagnet is deenergized, and providing an external flux path for the additive flux of both said second permanent magnet and said second electromagnet when said second electromagnet is energized, said motor further comprising means for energizing and deenergizing said second electromagnet.

* * * * *